Aug. 10, 1926.
G. A. BURRELL ET AL
1,595,683
PROCESS FOR EXTRACTING VAPORS FROM GASEOUS MIXTURES
Filed June 18, 1920
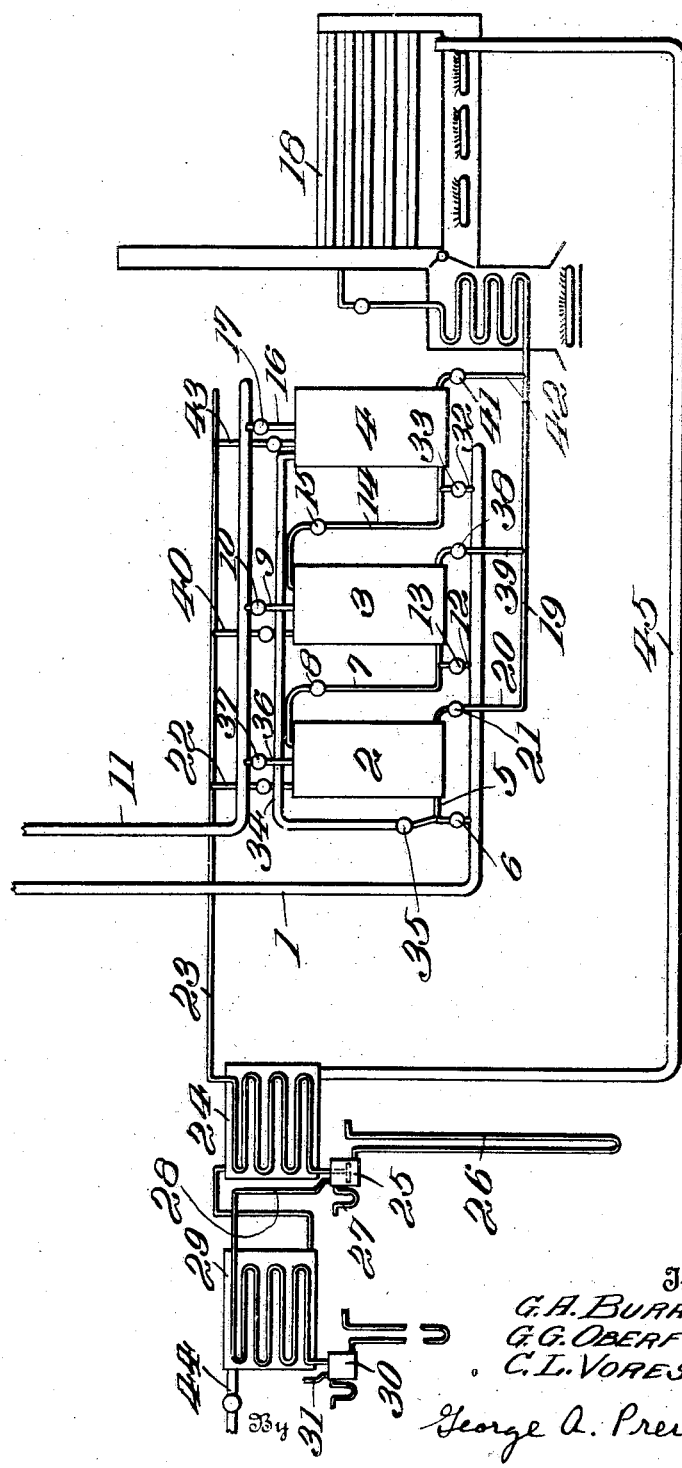
Inventors
G. A. BURRELL,
G. G. OBERFELL and
C. L. VORESS.
By George A. Prevost
Attorney Patented Aug. 10, 1926.

1,595,683

UNITED STATES PATENT OFFICE.

GEORGE A. BURRELL, OF NEW YORK, N. Y.; GEORGE G. OBERFELL, OF TULSA, OKLAHOMA; AND CLYDE L. VORESS, OF BRADFORD, PENNSYLVANIA, ASSIGNORS TO GASOLINE RECOVERY CORPORATION, A CORPORATION OF DELAWARE.

PROCESS FOR EXTRACTING VAPORS FROM GASEOUS MIXTURES.

Application filed June 18, 1920. Serial No. 389,953.

This invention relates to an improved process and apparatus for separating and recovering gasoline, naphtha, kerosene, benzol, toluol, alcohol, ether. acetone, amylacetate, ethyl alcohol, propyl alcohol, butyl alcohol, chloroform, carbontetrachloride, ammonia and formaldehyde, or any other substance of commercial value amenable to recovery by this process, from gaseous or vapor mixtures.

In applications for U. S. Letters Patent filed by G. G. Oberfell and G. A. Burrell on May 20, 1919, Serial No. 298,559 and G. G. Oberfell, filed Dec. 6, 1919, Serial No. 342,881, there is set forth methods of separation and recovery of gasoline and other hydrocarbon vapors from gaseous mixtures by the use of an absorbing medium such as activated charcoal, and the subsequent extraction of said vapors from the absorbent by heating said absorbent to drive off the vapors. The vapors are then condensed.

The present process contemplates driving off the vapors from the absorbent by introducing steam directly into the absorbent and the vapors are subsequently condensed and the water separated therefrom.

The invention consists broadly in passing a gaseous mixture containing the vapors to be recovered, through a solid activated absorbent medium until said medium is impregnated with the vapors. Then superheated steam is introduced into the absorbent and the vapors are driven off with the steam. Subsequently the vapors and the steam are condensed and the condensate is separated by gravity into the condensate from the gas and the aqueous condensate from the steam.

The invention includes the new method and novel features hereinafter described in connection with the accompanying drawing and more particularly pointed out in the appended claims.

The drawing shows a diagrammatic view of an apparatus for carrying out the process.

For the purpose of description the invention will be set forth as applied for obtaining hydrocarbon vapors from natural gas but it will be understood that the invention is not limited to such application.

In the drawing 1 designates the gas inlet pipe which conveys natural gas from any suitable supply to the absorber 2. This absorber, as well as the absorbers 3 and 4, is filled or partially filled with solid absorbent such as activated charcoal, silica gel, or the like. The gas passes from the pipe 1 through a conduit 5, having a valve 6, into the tower 2. The gas leaves the top of absorber, 2 through a pipe 7 having a valve 8 and it is conveyed by this pipe to the bottom of the absorber 3. Denuded gas passes from the top of absorber 3 through a conduit 9 having a valve 10, into the gas exit pipe 11, which conveys the same to a suitable reservoir or place of consumption.

When the absorbent in tower 2 has become saturated or impregnated with hydrocarbon vapors or condensate, the valves 6, 8 and 10 are closed and the gas in pipe 1 passes through a conduit 12, having a valve 13, directly into the bottom of the tower 3. The gas then leaves the tower 3 through the conduit 14, having a valve 15, and passes into the bottom of the tower 4, from which it is conveyed through a pipe 16, having a valve 17, to the exit pipe 11.

While absorption is taking place in towers 3 and 4, superheated steam, heated to between 125° C. and 750° C. is passed from a heater 18, through pipes 19 and 20 to the bottom of the tower 2 and directly into the impregnated absorbent contained therein. A valve 21 controls the admission of steam to this tower. This superheated steam volatilizes the greater portion of the vapors in the absorbent in tower 1 and these vapors, together with the steam, are conducted through a valved conduit 22 into the outlet pipe 23 which conveys the vapors and steam to a condenser 24. In this condenser most of the steam and part of the absorbed vapors are condensed and the condensate flows into a gravity separator 25 from which the aqueous liquor may be drawn off through a trap pipe 26, while the hydrocarbon condensate passes off through a trap pipe 27.

The vapor and steam which is not condensed in the condenser 24 and separator 25, passes by way of a pipe 28 into a second condenser 29 where the remainder of the steam and the major portion of the remaining vapors are condensed. The condensate and remaining vapor pass into a similar separator 30 from which the vapor and tail gases pass off by way of a pipe 31.

When the proper saturation in absorber 3 is reached, the valves 13, 15 and 17 are closed and the gas is admitted directly through a pipe 32, having a valve 33, to the absorber 4. The gas passes from this absorber through a pipe 34, having a valve 35, to the absorber 2, from which the vapors previously absorbed have been removed in the manner heretofore stated. The gas passes out of absorber 2 through a pipe 36, having a valve 37, which conducts it to the exit pipe 11. During the time that vapors are being absorbed in towers 4 and 2, a valve 38 in steam pipe 39 is opened and steam is admitted to the tower 3. This steam volatilizes the vapors in this absorber and the steam and vapors pass to the condensers by way of valved pipe 40 and pipe 23.

When the absorbent in tower 4 becomes impregnated, the valves 33, 17 and 35 are closed and the valves 6, 8 and 10 are opened and then the gas passes successively through the towers 2 and 3. During this period a valve 41 in a pipe 42 is opened to admit steam to tower 4, and the vapors and steam pass from said tower through the valved pipe 43 and pipe 23 to the condensers and separators. This cycle is completed and followed indefinitely.

In the foregoing description in connection with the absorbing media, we have used the terms, impregnated, saturated, fully impregnated, fully saturated, etc. The idea, however, is to saturate or impregnate to a point where the process becomes commercially profitable.

In connection with the foregoing process, we wish to particularly call attention to the following:—

At the time when the steam is turned away from any one of the absorbers, the charcoal or other solid absorbent is left very hot, perhaps 250° C. to 350° C. Now, by making this absorber the second of a series to receive the residue gas, the problem of cooling is solved. At first the absorbent in 2 being almost denuded of vapor practically removes all vapor desired from the gas mixture. Near the end of absorption time, the absorbent in absorber 3 is cooled to normal and gathers any vapors escaping from the nearly saturated absorbent in absorber 2.

By using two condensers, we are able to so regulate the flow of water in the first condenser that its temperature may remain between 80° and 90° C. This is accomplished by feeding the water into the condensers through a valved pipe 44 and withdrawing the same through a pipe 45 which conveys the warm water to the heater or boiler 18. This provides a supply of warm water for boiler use and conserves much heat which would otherwise be lost.

It is a fact when gaseous mixtures containing fractions of different volatility are subjected to absorption media such as activated charcoal, silica gel, or other solid absorbent, that material of a very wide range or volatility is absorbed. As larger quantities of the gas mixture are passed through the absorbent, the more volatile are again volatilized and the less easily volatilized ones are selected to replace them. This principle may be taken advantage of by the present process and apparatus by properly regulating the volume and rate of flow of the gaseous mixture to produce "selective" absorption. This enables us to obtain more stable products and lower vapor tension than would otherwise be possible.

The principle of selective absorption as employed in our process is a very great aid toward condensation of the desired vapors. It reduces the quantity of vent gases in distillation which would otherwise sweep desired vapors through the condensers and prevent their condensation. If it is desired to re-absorb or compress the remaining vent gases from our apparatus, the elimination of the more volatile fractions by selective absorption greatly simplifies the partial pressure equation.

We have found in practice that by passing the steam downward instead of upward through the absorber, we are enabled to make quite a saving in the amount of steam used. We believe that this is due to the fact, that condensed water drains through the charcoal and does not have to be revolatilized again as it does in the case where the steam is passing upward. Therefore, while we have illustrated the apparatus and described the process as disclosing the idea of passing the gas and steam upwardly, we realize that both the gas and steam may be passed downardly and consequently we have not limited our claims to the passage of either the gas or steam in any particular direction.

By removing condensed material at certain periods determined by the nature of the product desired we are able to obtain from certain gas mixtures more clear cut fractions than by any method now in practice. We have found that steam used as the agent for expelling the absorbent vapors from the charcoal, also serves a valuable function in that it further activates the charcoal, making it more porous the longer it is used and consequently more effective as an absorbent.

While we have specifically mentioned superheated steam, owing to its being found very advantageous in connection with charcoal, we may call attention to the fact that we have conducted some operations without the use of superheated steam and that we have in these operations recovered from 70 to 80 percent of the condensable vapors. We, therefore, do not limit our disclosure specifically to the use of superheated steam for the removal of the vapors but may use other vapors or heated gases.

A few of the advantages of the present system may be enumerated as follows:

I. It is a simple, compact system occupying less space and using fewer units than any absorption system now in use.

II. With its use more commercial product can be recovered from the same gas mixture than by the naphtha absorption process.

III. The product from this process contains less residual gas and is, therefore, less liable to loss in shipment and storage.

IV. This process admits of closer and more intelligent operation than the naphtha process in that, since it is a "batch" process it permits of the principle of selective absorption and allows for the elimination of much of the undesirable constituents which tend to prevent condensation in the condensers.

V. The process may be used at any pressure sufficient to cause the gas to flow. Higher pressures allow higher saturations to be carried which reduce cost of production but these higher pressures are not, in themselves, an essential factor.

VI. There is a continual waste in naphtha plants due to naphtha being carried from the absorbers with the gas flow or emulsified by the steam in the stills and later being lost in the separation tank. In this process the only loss of absorbent is that due to a very small amount of mechanical wear.

VII. The system has no heavy duty compressors or oil pumps to require attention. It has no high pressure lines to keep in repair.

VIII. The process can be used to obtain more clear cut fractions from certain gas mixtures than any method now in common use.

IX. The process and system lends itself readily to either small or large scale work. A naphtha plant required rather a large installation to utilize heat exchange and cover overhead burden.

X. The process lends itself readily to the building of a standardized plant either of the portable or large type.

XI. The process, by its very inherent nature is assured of a very "active" absorbent due to its steam treatment after each absorption.

XII. The process yields as a by-product after absorption from certain gas mixtures, a very volatile liquid of high heating value.

What we claim and desire to secure by Letters Patent is:—

1. A process for the recovery of mineral oil vapors from gaseous mixtures containing mineral oil vapors having individual boiling points which form a list of temperatures varying at the extremes over a range of 10° F., or more, which consists of contracting a gaseous mixture with particles of activated carbon wherein a portion of the mineral oil vapors are absorbed within a fraction of a second after such contact, then passing more of the gaseous mixture so that the lower boiling vapors are gradually revolatilized and higher boiling oil vapors absorbed until such time as the mineral oil vapors which are desired for recovery are held and the majority of the lower boiling vapors are excluded, then introducing a volatilizing agent directly into said charcoal for distilling the absorbed vapors, then separating the condensed portion of the vapors from said volatilizing agent by the action of gravity, and condensing the second portion of the vapors subsequently to the first condensation by cooling or pressure and cooling.

2. A process as defined in claim 1 in which the volatilizing agent is steam.

3. In a process for the recovery of liquefiable vapors from gaseous mixtures, the particular steps of selective absorption which consists in passing the gas mixture containing two or more liquefiable vapors with different boiling points in contact with activated charcoal so that portions of each are absorbed during the first short interval of contact, and later passing more of the gaseous mixture containing the same liquefiable vapors in contact with said charcoal for a period of time during which the lower boiling vapors are gradually evaporated from the charcoal and the higher boiling vapors are condensed in their place.

4. An apparatus for recovering vapors from gaseous mixtures containing the same, including a plurality of absorbing units containing activated charcoal, a common gas inlet pipe, means for connecting said pipe to each of said units, a gas outlet pipe, means connecting the outlet pipe to each of said units, valved gas conveying pipes connecting the top of each unit to the bottom of another unit, a volatilizing-agent generator, an outlet pipe for said generator, valved pipes connecting the generator outlet pipe, valved pipes connecting the vapor pipe to said units, a condenser connected to the vapor pipe, a gravity separator connected to the condensate outlet of said condenser, a second condenser connected with said gravity separator, a second gravity separator connected with the condensate outlet of the second condenser, means for passing a cooling medium through the second condenser and first condenser in the order named, and a pipe for conveying the cooling medium from the second condenser to the volatilizing agent generator.

In testimony whereof, we affix our signatures.

GEORGE A. BURRELL.
GEORGE G. OBERFELL.
CLYDE L. VORESS.